United States Patent [19]

Aine et al.

[11] Patent Number: 4,783,237

[45] Date of Patent: * Nov. 8, 1988

[54] SOLID STATE TRANSDUCER AND METHOD OF MAKING SAME

[75] Inventors: Harry E. Aine, 8601 Signal Ridge Rd., Box 304, Philo, Calif. 95466; Barry Block, 30610 Page Mill Rd., Los Altos, Calif. 94022

[73] Assignees: Harry E. Aine; Barry Block, both of Philo, Calif.

[*] Notice: The portion of the term of this patent subsequent to Jun. 22, 2003 has been disclaimed.

[21] Appl. No.: 873,854

[22] Filed: Jun. 11, 1986

Related U.S. Application Data

[63] Continuation of Ser. No. 556,833, Dec. 1, 1983, abandoned.

[51] Int. Cl.[4] .............................................. H01L 21/02
[52] U.S. Cl. ..................................... 437/15; 156/648; 156/655; 156/659.1; 156/644; 156/647; 437/225; 29/610 SG; 29/580
[58] Field of Search ............... 156/628, 644, 647, 648, 156/650, 651, 654, 657, 659.1, 662, 655, 345; 148/1.5, 171, 175; 29/580, 584, 586, 595, 610 SG; 338/2, 4, 42, 47; 73/510, 517 R, 726, 754; 361/283; 357/26

[56] References Cited

U.S. PATENT DOCUMENTS

| 3,022,570 | 2/1962 | Taylor | 228/903 X |
| 3,244,555 | 4/1966 | Adam et al. | 156/657 X |
| 3,689,389 | 9/1972 | Waggener | 156/648 X |
| 3,853,650 | 12/1974 | Hartlaub | 156/655 |
| 4,029,542 | 6/1977 | Swartz | 156/662 X |
| 4,071,838 | 1/1978 | Block | 338/47 |
| 4,144,516 | 3/1979 | Aine | 29/580 X |
| 4,472,239 | 9/1984 | Johnson et al. | 156/647 |
| 4,597,003 | 6/1986 | Aine et al. | 156/648 |

OTHER PUBLICATIONS

Peterson, K. E., "Dynamic Micromechanics on Silicon: Techniques and Devices"; IEEE Transactions on Electronic Devices, vol. ED-25, No. 10, pp. 1241-1250, 10/1978.

*Primary Examiner*—Kenneth M. Schor
*Attorney, Agent, or Firm*—Harry E. Aine

[57] ABSTRACT

Folded cantilever structures and solid state force transducers using same are made by chemical etching of a semiconductive wafer. In the chemical etching process, an etch stop layer is provided on a wafer of semiconductive material. The etch stop layer is opened in a certain pre-determined pattern and etchant is introduced through the opening in the etch stop layer to produce substantial undercut etching of portions of the etch stop layer. The opening is patterned to define a support structure (frame) for the folded cantilever portion which is undercut. The etch is terminated such that one end of the undercut folded cantilever structure is supported from the frame and the other end terminates on a structure such as a mass that is supported from the frame by means of the folded cantilever structure.

12 Claims, 3 Drawing Sheets

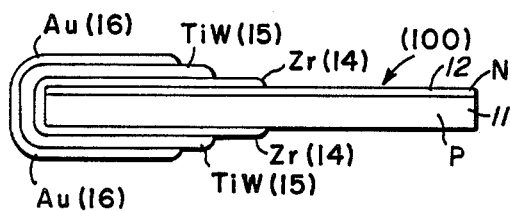
Fig_1
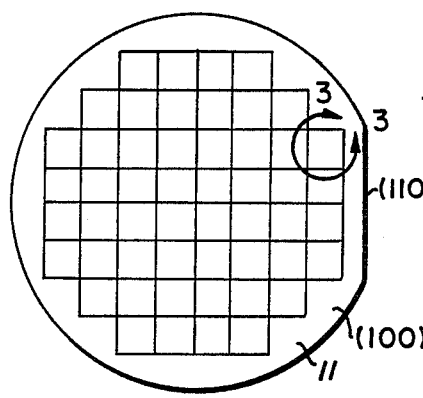
Fig_2
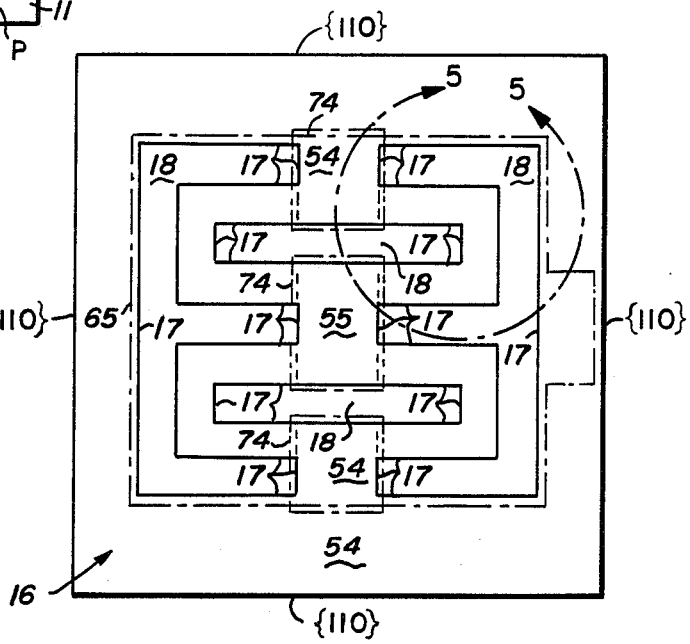
Fig_3
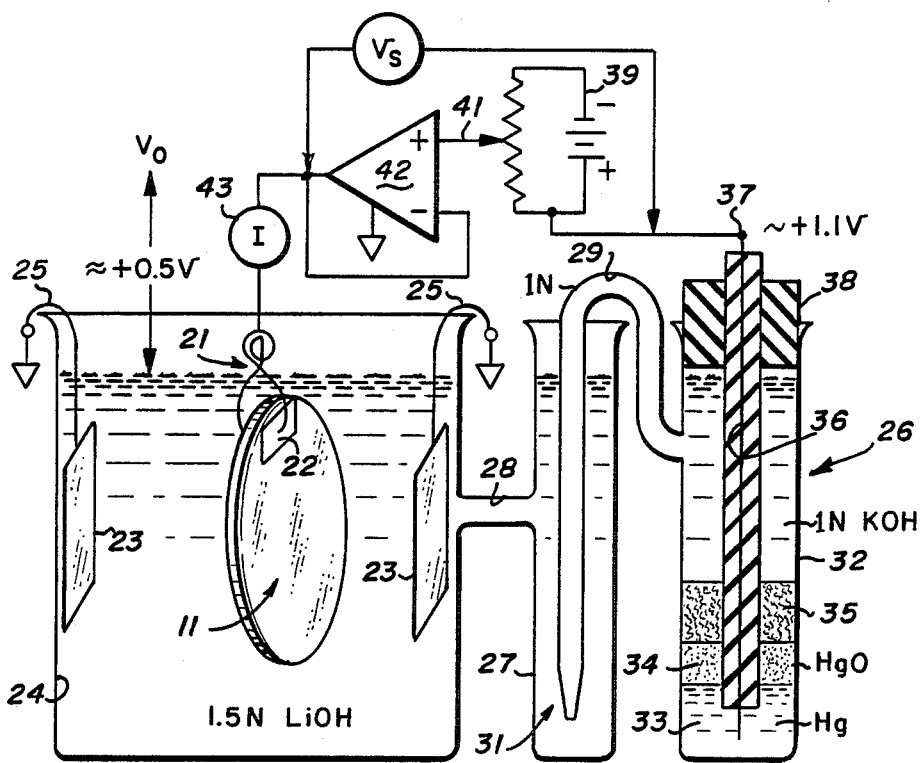
Fig_4

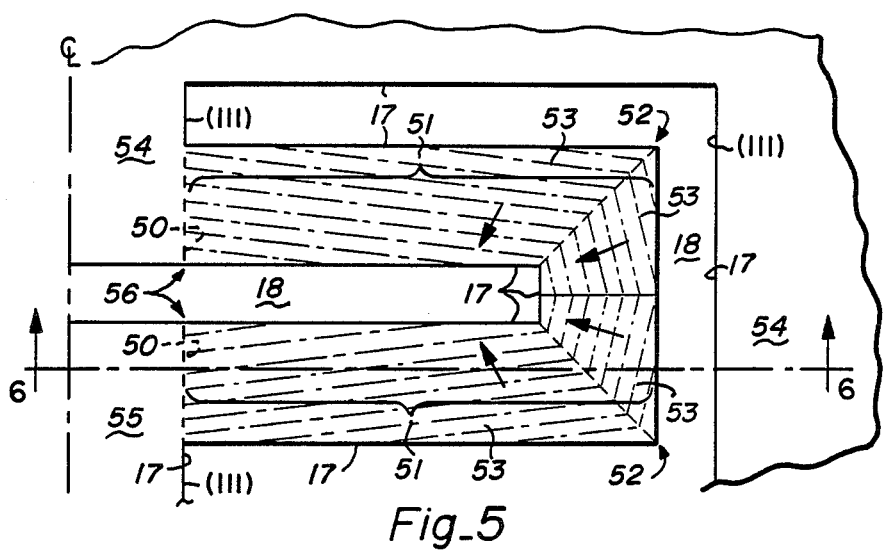
Fig_5
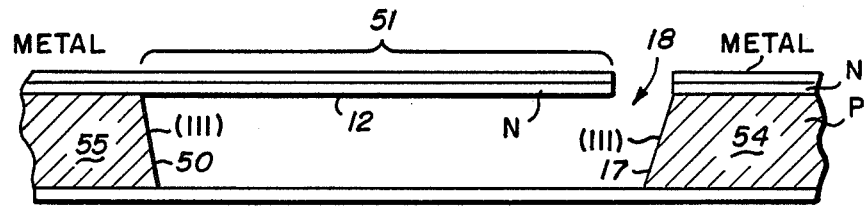
Fig_6
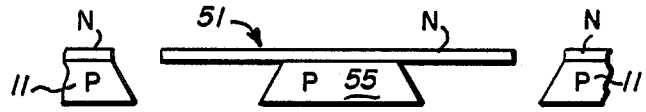
Fig_7
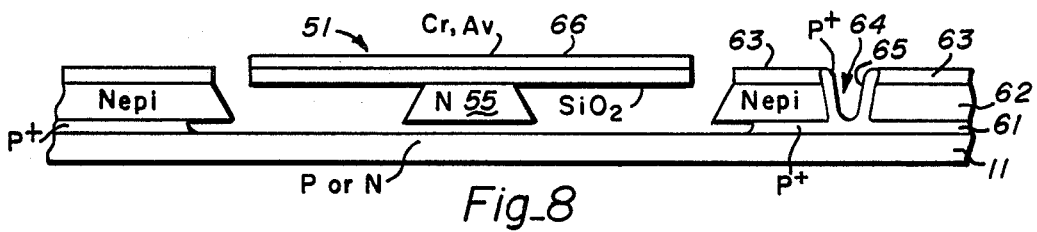
Fig_8
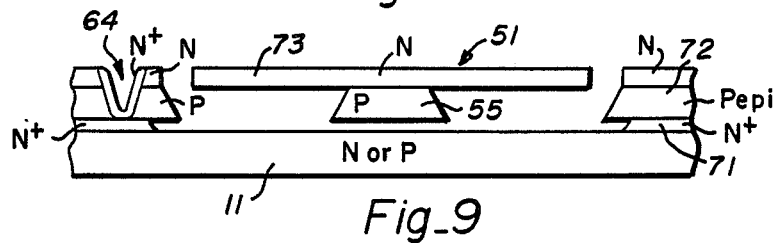
Fig_9
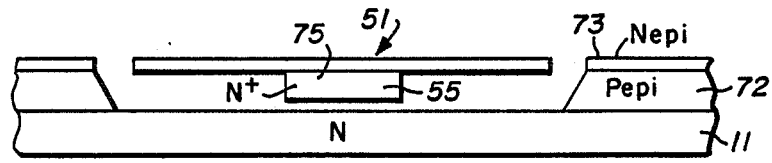
Fig_10

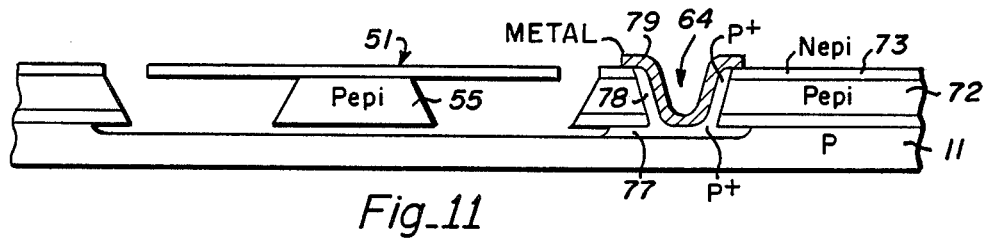
Fig_11
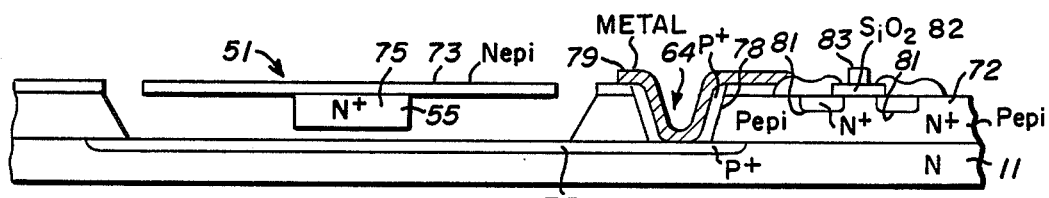
Fig_12
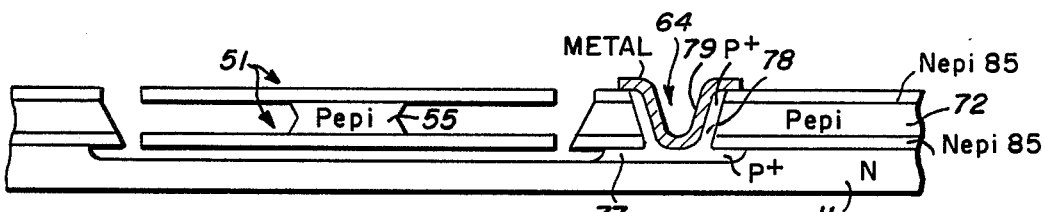
Fig_13
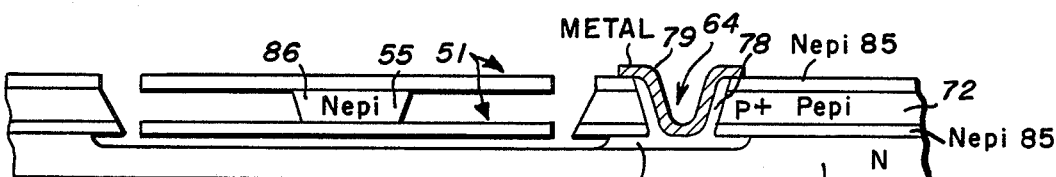
Fig_14
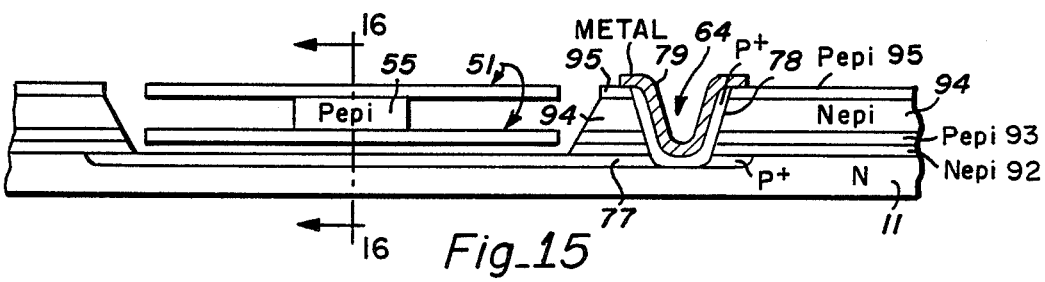
Fig_15
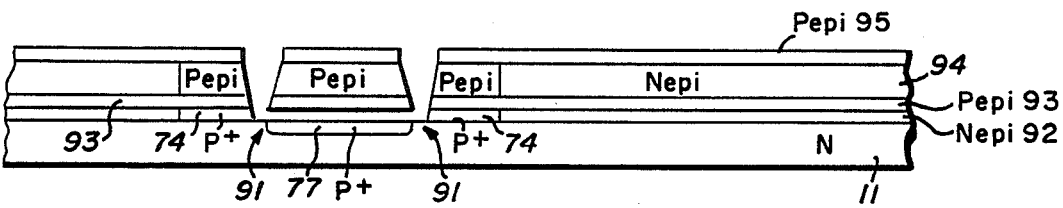
Fig_16

SOLID STATE TRANSDUCER AND METHOD OF MAKING SAME

This application is a continuation, of application Ser. No. 556,833, filed Dec. 1, 1983, now abandoned.

BACKGROUND OF THE INVENTION

The present invention relates in general to an improved solid state force transducer and method of making some wherein a semiconductive wafer is chemically etched to form a three-dimensional structure and, more particularly, etched through an opening in an etch stopped layer for undercutting the layer to form a doubled back cantilever beam.

DESCRIPTION OF THE PRIOR ART

Heretofore, it has been known to form a single cantilever beam (leaf spring) by etching through and undercutting an etch stopped layer to form the leaf spring or cantilever beam. The beam was supported at one end from an unetched support portion of the wafer and was free to flex at the other end. In some cases, silicon dioxide cantilever beams, formed in this manner, have been additionally loaded at their free ends with a gold mass to increase the sensitivity of the flexure of the beam to gravitational forces. Devices of this type are disclosed in an article entitled: "Silicon as a Mechanical Material", appearing in the proceedings of the IEEE, Volume 70, No. 5 of May 1982 at pgs. 443-452.

It is also known from this prior art to provide an etch stopped P+ buried layer electrode under the cantilever beam to define a capacitive gap between the beam and the P+ layer. Deflection of the beam could be detected to form an accelerometer or the beam could be independently deflected by applying a voltage between a layer of metallization on top of the cantilever beam and the buried P+ layer.

Some of the problems associated with accelerometers of the aforecited type are that the single cantilever beam does not exhibit a linear deflection in response to acceleration. Moreover, the mass loading to increase its sensitivity is of dissimilar material, typically gold, thereby introducing undesirable temperature coefficients. In any case, the accelerometer has an unsymmetrical flex which is subject to undesired cross-axis coupling coefficients, i.e., it is sensitive to components of acceleration orthogonal to the sensing axis of the accelerometer.

Heretofore, it has been proposed to make accelerometer flex structures by chemically etching a silicon wafer through its major faces to define in each one of an array of a doubled back (folded) cantilever beam with an integral, centrally located silicon mass, thereby avoiding the temperature coefficients associated with the dissimilar mass loading and resulting in a flex structure having substantially improved linearity. Such an accelerometer is disclosed in U.S. Pat. No. 4,071,838 issued Jan. 31, 1978 and its reissue application Ser. No. 115,610 filed Jan. 28, 1980. It has also been proposed to make such an accelerometer flex structure symmetrical by etching a pair of silicon wafers and bonding the etched wafers together in back-to-back relation with the masses in registration to form the symmetrical accelerometer flex structure. Devices of this type are disclosed in U.S. Pat. No. 4,144,516 issued Mar. 13, 1979.

While the latter techniques may be employed for fabrication of symmetrical accelerometer flex structures, there are certain problems associated therewith that it would be desirable to eliminate. One of the problems is that the composite symmetrical flex structure, fabricated by bonding together two wafers, introduces substantial handling and processing of the relatively fragile etched wafer tending to reduce the yield of acceptable devices. In addition, bonding material, used to bond the two wafers together, typically has a temperature coefficient substantially different than that of the silicon flex structure such that undesired temperature coefficients are introduced into the composite structure. Moreover, in the case of a capacitive sensor for sensing deflection of the flex, with capacitive gap spacings on the order of microns, variations in the thickness of this bonding layer result in variations in the overall thickness of the flex structure thus producing unwanted variations in the capacitance of the capacitor gap of the capacitive sensor.

Furthermore, etching the wafer from both sides to define the folded cantilever flex structure with integral mass introduces alignment problems between the alignment of the etch on the frontside and the alignment of the etch on the backside of the wafer. It would be desirable if the structure could be etched from only one side of the wafer. Also, in the case where the integral mass structure is formed by an unetched portion of the wafer resulting from the backside etch which defines the thin membrane or cantilever, exterior corners are formed on the mass which necessitate attention to corner compensation, thereby introducing complexities into the etch process.

It would be highly desirable if folded cantilever flex structures could be etched having an integral mass structure, such etch being performed from only one side of the wafer. Furthermore, it would be highly desirable if symmetrical folded cantilever flex structures of the type disclosed in the aforecited U.S. Pat. No. 4,144,516 could be fabricated by etching a single semiconductive wafer from one side.

SUMMARY OF THE PRESENT INVENTION

The present invention relates in general to an improved solid state force transducer and method of making some wherein a semiconductive wafer is chemically etched by etching through and undercutting one or more etch stopped layers.

In one feature of the present invention, a doubled back cantilever beam is formed in a semiconductive wafer by etching through an opening having a predetermined pattern and undercutting an etch stopped layer to define the structure. In this manner, doubled back cantilever structures are fabricated by etching the wafer from only one side.

In another feature of the present invention, the opening in the etch stopped layer, through which the etchant is introduced, is patterned in such a manner that the etch undercuts the etch stopped layer to form a cantilever beam portion remote from the frame structure, whereby an integral mass is formed on the cantilever beam by the etch process.

In another feature of the present invention, the cantilever beam and the integral mass are both of single crystalline semiconductive material, whereby undesired temperature coefficients are minimized.

In another feature of the present invention, the integral mass structure is also undercut by the etchant to provide a spacing between the integral mass structure and the remaining portion of the wafer to free the integral mass structure and cantilever beam.

In another feature of the present invention, a P+ type conductivity buried layer is formed below and spaced from the integral mass structure to define one electrode of a capacitive sensor for sensing movement of or deflecting the integral mass structure relative to the P+ electrode.

Other features and advantages of the present invention will become apparent upon a purusal of the following specification taken in connection with the accompanying drawings wherein:

BRIEF DESCRIPTION OF THE DRAWINGS

FIG. 1 is a transverse sectional view, partly cut away, of a semiconductive wafer metallized for masking of the wafer in accordance with the provisions of the present invention, FIG. 2 is a plan view of the wafer of FIG. 1 photomasked for etching, FIG. 3 is a detail plan view of that portion of the photomasked and etched wafer delineated by line 3—3 of FIG. 2, FIG. 4 is a schematic, line diagram, partly in block diagram form, of an electro-chemical etch apparatus useful for etching wafers in accordance with provisions of the present invention, FIG. 5 is an enlarged plan view of a portion of the structure of FIG. 3 delineated by line 5—5, FIG. 6 is a cross-sectional view of the structure of FIG. 5 taken along line 6—6 in the direction of the arrows, FIG. 7 is a view similar to that of FIG. 6 with the metal etch mask removed, FIG. 8 is a view similar to that of FIG. 7 depicting an alternative embodiment of the present invention, FIG. 9 is a view similar to that of FIG. 8 depicting an alternative embodiment of the present invention.

FIGS. 10-15 are views similar to that of FIG. 9 depicting alternative embodiments of the present invention, and FIG. 16 is a cross-sectional view of the structure of FIG. 15 taken along lines 16—16 in the direction of the arrows.

DESCRIPTION OF THE PREFERRED EMBODIMENTS

Referring now to FIGS. 1 and 2, there is shown a semiconductive wafer 11 of diamond cubic material, such as Si, Ge or gallium arsenide. In a typical example, wafer 11 has a thickness of approximately 15 mils, a diameter of approximately three inches and is made of single crystalline silicon doped with P-type dopant to a conductivity of between 1-10 Ωcm. The wafer 11 is cut from the single crystal in such a manner as to provide the [100] major faces on opposite sides of the wafer. The wafer typically has a flat corresponding to one of the [100] faces. The wafer 11 is polished on both major faces to a flatness on the order of a few microns. The bow of the wafer preferably is as low as possible and preferably less than 10 microns. An opposite or N-type conductivity epitaxial layer 12 is grown on the top major face of the wafer 11 with a resistivity of 1-10 cm. In a typical example, epitaxial layer 12 is grown to a thickness of between 0.2 and fifteen microns. The thickness of the epitaxial layer will depend upon the nature of the structure which it is desired to fabricate. In the case of an accelerometer, the aforementioned 0.2 to fifteen micron thickness is suitable.

The wafer 11 is metallized all over for providing an etch resistant electrically conductive layer that will be employed as a part of the etch mask and as an electrode for an electro-etch stop etch process. In a typical example, the metallization layers comprise a base layer 14 of zirconium, as of 2,000 A thick, deposited by sputter deposition onto the epitaxial layer 12. Next, titanium-tungsten layer 15 is deposited to a thickness of, for example, 500 A to provide an adhesion layer between the zirconium and a subsequent layer of gold. Next, a gold layer 16 is deposited, as by sputter deposition, to a thickness of 3,000 A onto the titanium-tungsten layer 15. Wafer 11 is then electroplated with gold to a total gold layer thickness of approximately three microns to provide a pinhole-free gold metallization layer over the entire wafer.

After the wafer 11 has been metallized, it is coated as by spin coating, with photoresist and exposed and developed on the top face to a slot mask pattern of the type as shown in FIG. 3. The sidewalls 17 which define the interior corners of the slots 18 are to be defined by the [111] planes of the crystalline material and are aligned parallel to the [110] planes. The metal layers are etched through the developed openings in the photoresist layer by suitable etchants. For example, gold is etched using a potassium iodide base etchant, the TiW is etched by an aqueous solution of hydrogen peroxide and the zirconium is etched by a 100 to 1 dilute aqueous solution of hydrofluoric acid. This opens the metallization in the pattern as shown in FIG. 3 to the N epi layer 12. This epitaxial layer 12 will constitute the etch stop layer when the substrate P material 11 is being etched. The etch stop layer 12 is opened to expose the substrate P material by etching the wafer in a suitable silicon etch such as a 1.5 normal aqueous solution of lithium hydroxide at a temperature of approximately 85° C. The etch rate for Si in lithium hydroxide is approximately three microns per minute at the aforecited temperature and normality.

Next, an etch stop potential is applied to the etch stop layer 12 to passivate this layer, while allowing etching of the substrate P material. A suitable electro-etch stop etching apparatus is as shown in FIG. 4. More particularly, the gold layers on opposite sides of the wafer 11 are clasped between spring biased tongs 21. The tongs should be made of an etch resistant material, for example, zirconium wire. The ends of the zirconium wire which are to make contact with the wafer 11 preferably contact the wafer through the intermediary of a pair of platinum tabs 22 to provide a relatively large area contact. The wafer 11 is located between a pair of platinum electrodes 23 which hang inside the etch container 24, as of quartz, by short lengths of platinum wire 25 bent over the edge of the container 24. The platinum wires 25 are connected to ground potential.

A standard electro-chemical cell 26 provides an output reference potential as of +1.1 volts relative to the potential of the electrolyte in the etch tank 24. The electrolyte of the standard cell 26 is, for example, a one normal aqueous solution of potassium hydroxide and it makes electrical contact to the electrolyte in the etch tank 24 via a side tube 27 connected in fluid communication with the etch tank 24 by tubulation 28. A flexible side tube 29 of the standard cell 26 terminates in a capillary 31 immersed in the electrolyte within the side tube 27.

In a typical example, the standard cell 26 comprises a test tube 32 having a few cm$^3$ of liquid mercury 33 located in the bottom of the test tube. Next, a relatively thin layer of mercury oxide 34 is placed over the mercury layer 33. Next, glass wool 35 is loosely packed into the test tube for holding the mercury oxide powder in position over the mercury and also for holding an insulated copper lead 36 in vertical position within the central region of the test tube 32. One bare end of the insulated lead 36 is immersed within the mercury layer 33. The other end of the insulated lead 36 provides the output terminal 37 of the standard cell 26. The insulated lead 36 passes through a rubber stopper 38 which stops the upper end of the test tube 32. The test tube is filled with a suitable electrolyte such as a one normal aqueous solution of potassium hydroxide. Thus, the potential on output terminal 37 of the standard cell is always a known reference potential, such as +1.1 volts, relative to the potential of the electrolyte in the etch tank 24.

In the electro-etch stop process, a passivating potential of approximately +0.5 volts is applied to the layer of silicon to be etched stopped relative to the potential of the etchant (electrolyte) such as a 1.5 normal aqueous solution of LiOH at 85° C. This is achieved in the circuit of FIG. 4 by means of a reference battery 39 poled in opposition to the standard cell output voltage at terminal 37. A potentiometer 41 is connected across battery 39 and the output of the potentiometer 41 is fed to the positive input terminal of an operational amplifier 42 having its output connected back to its minus input reference terminal. The battery 39, potentiometer 41 and operational amplifier 42 having its output connected back to its minus input reference terminal. The battery 39, potentiometer 41 and operational amplifier 42 produce an output voltage $V_s$ of negative polarity relative to the polarity of the reference potential at the output of the standard cell 26. The voltage difference is the output voltage $V_o$ applied between the gold electrodes on the wafer 11 and the electrolyte in tank 24. $V_o$ is selected to be approximately +0.5 volts for passivation of the etch stop layer 12.

The operational amplifier 42 sources sufficient current, such as 0.5 amps, at constant voltage as selected by the potentiometer 41. The current passes from the operational amplifier 42 through an ammeter 43 and thence through the clip 21 to the gold electrodes 16 on the wafer 11. The current then is drawn through the non-etch stopped portion of the wafer, such as the electrolyte epxosed P material, to ground via the platinum ground electrodes 23. No current is drawn by the standard cell 26 nor by the voltage selecting portion of the operational amplifier 42. Operational amplifier 42 does not have a ground common to the platinum electrodes 23 for current sinking the current drawn through the etch tank.

Referring now to FIGS. 3, 5, 6 and 7, the anisotropic etch through the wafer to define the folded cantilever (leaf spring) structures is as follows: after the epitaxial layer 12 has been slotted in accordance with the slot pattern 18 of FIGS. 3 to expose the underlying P-type conductivity semiconductive material, the etch stop potential is applied and the circuit completed as shown in FIG. 4. Thereafter, the anisotropic etch proceeds through slots 18, clear through the wafer 11 to the metal layer on the bottom. After etching through the thickness of the P material, the etchant begins to substantially undercut the etch stop layer 12 to define doubled back folded cantilever beam portions 51.

The undercut etch starts at the exterior corners 52 of the folded cantilever beam portions 51 and etch facets from parallel to the [211] planes indicated by the hatching lines 53. These facets 53 are etched (recede) in the direction of the arrows. When the etch facets 53 intersect with the [111] planes, at the walls at opposite ends of the cantilever beam portions 51, they terminate on the [111] planes and form a continuation of the [111] walls, indicated by dotted lines 50, which intersect with the [111] planes of the slots 18, thereby forming exterior corners 56.

The undercutting is terminated when the undercutting has advanced to the state where the folded cantilever beam (leaf spring) portions 51 are completely undercut leaving boss portions 54 of the frame structure at one end and a mass structure 55 at the other end of the undercut doubled back folded cantilever beam portions 51. The boss portion is an extension of the frame, and the boss portion together with frame make up support structure 54 (although the support structure need not include the frame for the purposes of the invention). The frame 54 is separated from the mass by means of slots 18. Thus, at the termination of the undercutting etch, the doubled back cantilever spring structure is formed. Next, the metal mask is stripped to produce the structure of FIG. 7, wherein each of the cantilever beam portions 51 is fixedly secured at one end to the frame 54 via the boss portion 54 and at the other end is fixedly secured to the central mass structure 55. The mass is free to move relative to the frame by flexure of the folded cantilever spring portions 51. The result is a composite frame, spring and mass structure suitable for an accelerometer and which is of single crystalline material.

After the etching has been completed, the metallization layers are stripped from the wafer 11 and the frame portions of the wafer with the array of folded cantilever spring structures may then be bonded, as by electric field assisted thermal bonding, to pyrex plates (not shown) on opposite sides of the wafer. The folded cantilever spring and mass portions are spaced from the pyrex on opposite faces of the wafer by a suitable spacer gap, i.e., 1–10 us, formed by etching recesses in the pyrex. These pyrex plates have arrays of electrodes for capacitively sensing deflection of the silicon flexes in response to inertia or gravitational forces to form completed accelerometer units. The bonded silicon and pyrex plates may then be separated into individual accelerometer devices by dicing with a dicing saw in a conventional manner.

As an alternative to N epi etch stop layer 12 on P-type substrate material 11, the epi layer 12 may be of P material on an N type substrate 11. The electro-etch stop is then applied in a similar manner as disclosed by U.S. Pat. No. 3,689,389 issued Sept. 5, 1972.

As another alternative, the etch stop layer 12 may be formed by a high concentration boron diffusion to form a P+ etch stop layer, i.e., boron impurity concentration $5 \times 10^{19} cm^{-3}$. In the case of a high concentration of boron P+ etch stop layer 12, a particularly suitable anisotropic etchant is ethylene diamine, pyrocatechol and water (EDP), as described in an article entitled: "A Water-Amine Complexing Agent System for Etching Silicon", appearing in the Journal of Electro-Chemical Society, Vol. 114, pg. 965 (1967). As another alternative, the etch stop layer 12 is silicon dioxide and the etchant for the silicon is ethylene diamine, pyrocatechol and water.

Referring now to FIG. 8, there is shown an alternative embodiment of the present invention. In this embodiment, a P or N substrate wafer 11 is employed. The wafer is preferably of the [100] crystallgraphic orientation. In the first, a P+ buried layer diffusion is diffused into the top of the substrate 11. The buried layer preferably has a concentration of boron impurity greater than $5 \times 10^{19} cm^{-3}$. A suitable depth is 1 to a few microns. Next, an N epi layer 62 is grown onto the substrate 11. In a typical example, the N epi layer has a thickness of 15 to 150 microns and a resistivity of 1 to 10 ohm centimeters. Next, a relatively thick layer of silicon dioxide 63, 0.2 to 1 micron thick is grown on the N epi layer. This silicon dioxide layer 63 may either be of the thermal or chemical vapor deposition (CVD) type. Next, a contact hole 64 is opened in the oxide and the underlaying silicon etched by suitable etchant such as EDP to the buried P+ layer. Thereafter, boron is diffused into the walls of the contact hole 64 to provide a P+ contact diffusion layer 65.

Next, the entire wafer is metallized with chrome gold the chrome being, for example, 500 A thick and the gold being, for example, 500 A to 3,000 A thick. The gold and chrome layers 66 are then opened by photomasking and suitable etching to the slot pattern as shown in FIG. 3. Thereafter, the silicon dioxide mask is etched in a suitable etchant such as buffered hydrofluoric acid (HF) to expose the N epi layer 62. Using the metal layer 66 and silicon dioxide as a mask, the N epi layer is etched with a suitable anisotropic etchant such as EDP. The etch is terminated when the folded cantilever beams 51 of SiO$_2$ have been defined as shown in FIGS. 5 and 6 leaving the centrally located inertial mass 55 affixed to the end of the folded cantilever beams 51 remote from the support structure or boss 54. The EDP etchant stops on the buried P+ layer.

Next, the buried P+ layer 61 is etched from underneath the mass 55 using an electro-chemical etch of the type which will remove P+ or N+ layers from more lightly doped substrates with a +0.5 bias potential applied to the layer 61 to be etched relative to the electrolyte. A suitable electrolyte (etchantΘ of this type has the relative proportions of 500 milliliters H$_2$O, 100 milliliters 50% HF and 100 milliliters of 98% H$_2$SO$_4$ with a plattinum cathode 23 in the apparatus of FIG. 3. The P+ layer 61 is etched so as to undercut the N epi mass 55 to provide a spacer gap between the central mass 55 and the underlaying N or P substrate 11. The etchant is preferably agitated during the etching process to remove and carry away hydrogen bubbles. Thereafter, the wafer is suitably photomasked for patterning of the chrome and gold metal layers 66 to provide an electrode overlaying the mass 55 with a thin lead to the frame 54.

The resultant wafer may then be field assisted thermally bonded to a pyrex plate, such as 7740 Pyrex, available from Corning Glass. The pyrex is preferably etched to provide a spacer between the chrome, gold metallization on the folded cantilever flex and the metal electrode on the surface of the pyrex plate to define a capacitive gap therebetween. Movement of the folded cantilever beam 51 and mass 55 can then be detected by measuring the change in capacity of the capacitive gap. Individual die are easily separated by dicing in the manner as aforedescribed.

In this embodiment, the silicon dioxide forms a folded cantilever beam 51 with the N epi integral mass 55. Electronic circuitry of the MOS type is readily fabricated on the upper face of the composite wafer by performing drain and source diffusions and depositing gate oxide with patterned aluminum metal providing the proper interconnects. The patterned aluminum may be deposited under the cr and Au layer 66.

Referring now to FIG. 9, there is shown an embodiment similar to that of FIG. 8 except that the folded cantilever beam 51 is formed of N epi so that the folded cantilever beam 51 and the mass 55 are both of single crystalline silicon to avoid undesired differences in the thermal coefficients of expansion of the beam 51 and mass 55. In this embodiment, an N or P substrate wafer 11 of [100] orientation has an N+ diffusion made into its upper surface; such diffusion having a depth of 0.5 to several microns and comprising the spacer layer and having a pattern as shown at 65 in FIG. 3.

Next, a P epi layer 72 is grown onto the wafer 11 to a suitable thickness of 15 to 150 microns. Next, an N epi layer 73 of 0.2 to 15 microns thickness is grown on the P epi layer 72. The wafer 11 is then suitably masked as by thermal or CVD oxide and a contact hole 64 opened in the oxide and the silicon etched through the hole 64 down to the N+ layer 71. A suitable etchant is EDP. Next, an N+ diffusion is diffused into the walls of the contact hole 64. Aluminum metal is then deposited over the N+ contact diffusion and patterned to provide a contact pad at the surface.

Next, the oxide is stripped and the N epi layer and contact pad is covered with a metallization of zirconium, TiW and gold as aforedescribed with regard to the embodiment of FIGS. 3–6. The metal is then opened in accordance with the slot pattern of FIG. 3 and the N epi layer etched by suitable etchant such as EDP to expose the P epi layer 72.

With a passivation potential of +0.5 volts applied to the N+ layer 71 and to the N layer 73 in the apparatus of FIG. 3, the wafer is then etched in EDP to an etch stop on the N+ layer 71. This defines the folded cantilever beam structure 51 in N type silicon with the P-type mass 55 integrally formed therewith. Next, using the electro-chemical etch aforedescribed for removing the P+ buried layer 61 in FIG. 8, the N+ spacer layer 71 is etched from underneath the mass 55, thereby freeing the mass 55 and cantilever beam 51 and providing a spacer of, for example, a few microns between the mass 55 and the substrate material 11.

The metal is then stripped from the wafer 11 leaving a single crystalline folded cantilever beam 51 with integral mass 55. The wafer is then, in the case of an accelerometer, bonded to a pyrex plate having suitable electrodes formed therein. The spacer between the folded cantilever beam 51 and the electrodes on the pyrex can be formed by either etching the pyrex or performing a preliminary spacer etch in the upper surface of the N epi layer 73.

One advantage to the structure of FIG. 9 is that the folded cantilever flex 51 and the mass 55 are of single crystalline silicon, thereby avoiding certain undesired temperature coefficients.

Referring now to FIG. 10, there is shown an alternative embodiment of the present invention. In this embodiment, a P epi layer 72, as of 10 to 150 microns thick, is grown on an N [100] substrate 11. An N epi layer 73, as of 0.2 to 15 microns thick, is grown on the P epi 72. Next, the wafer 11 is oxidized to provide a diffusion mask. The oxide layer is opened in the central region of the device in accordance with the pattern 74 of FIG. 3 corresponding to the boss regions 54 and the mass region 55. Next, an N+ diffusion is made through the N epi layer 73 and well into the P epi layer 72, such diffusion being terminated so as to leave a spacer region between the lower extent of the N+region and the bottom of the P epi region 72.

Next, the oxide is stripped and the wafer metallized with the metallization layers as shown in FIG. 1. The metal layer is opened to the slot pattern of FIG. 3. The silicon layer 73 is then etched to expose the P epi material 72 in accordance with the slot pattern of FIG. 3. Next, using the etch apparatus of FIG. 4 a passivating potential is applied to the N layers and the P epi region is etched anisotropically to form the folded cantilever beams 51 with the integral central mass 55. The mass 55 is entirely undercut during the etch of the P epi layer 72. The resultant structure may be utilized in the manner as aforedescribed with regard to FIG. 9.

Referring now to FIG. 11, there is shown an alternative embodiment of the present invention. The embodiment of FIG. 11 is similar to that of FIG. 9 with the exception that the spacer laeyr 77 is a P+ boron diffusion in a P substrate wafer 11. More particularly, a P+ buried layer diffusion 77 is made into the upper surface of the P [100] substrate 11 to a depth corresponding to the thickness of the spacer which is to be provided between the mass 55 and the recessed surface of the etched substrate material 11. The P+ buried layer diffusion 77 was the pattern indicated by line 65 of FIG. 3. A P epi layer 72, 10 to 150 μs thick, is grown on the P substrate 11. An N epi layer 73, 0.2 to 15 us thick, is grown on the P epi layer 72. The wafer is then oxidized to form a mask.

Next, a contact hole 64 is opened in the oxide to the silicon and the silicon anisotropically etched down to intersect with the P+ layer 77 using EDP etchant. A P+ diffused layer 78 coats the hole and provides a conductive connection to the buried P+ layer 77. A suitable metal, such as aluminum, is deposited and patterned at 79 over the P+ diffusion 78.

Next, the oxide is stripped from the N epi layer 73 and the metallization of FIG. 1 is deposited over the entire wafer 11. That metal layer is then photomasked and etched in accordance with the slot mask pattern of FIG. 3. The N epi layer 73 is then etched by EDP to expose the underlaying P epi layer 72. With the electro-etch stop passivating potential applied to the N epi layer 73, the P epi material is etched in accordance with the process described with regard to FIG. 4 with a suitable etchant such as EDP which stops on the underlaying buried P+ layer 77. Next, the electro-chemical etch process, previously described with regard to FIG. 8, is employed for selectively etching the P+ layer and undercutting the mass 55 to provide the spacer gap between the mass 55 and the substrate material 11. Next, the metal is stripped from the wafer 11. The resultant structure may be used in the manner previously described.

Referring now to FIG. 12, there is shown an alternative embodiment of the present invention. The embodiment of FIG. 12 is similar to that of FIG. 10 with the exception that a buried P+ diffused layer 77 is utilized as an integral electrode. More particularly, a P+ buried layer diffusion 77 is made into the upper surface of the N substrate 11. This layer has a thickness of 1 to a few microns. Next, a P epi layer 72, of a thickness between 10 and 150 microns, is grown on the substrate wafer 11. Next, an N epi layer 73 is grown on the P epi layer 72. The N epi layer 73 can have a thickness from 0.2 microns to 15 microns depending upon its ultimate application. An oxide is grown and opened in a pattern 74.

An N+ boss 54 and mass 55 diffusion 75 is then made through the N epi layer and into the P epi layer terminating at a point spaced from the P+ layer 77 by the amount of a space region. The N+ diffusion 75 has the pattern as shown at 74 in FIG. 3. The wafer 11 is stripped and reoxidized, the oxide opened in hole pattern 64 and an anisotropic etch made for a contact hole 64 to the P+ layer 77. A P+ diffusion is then made at 78 lining the hole 64 and a layer of metal 79 deposited over the P+ diffusion. Also, N+ diffusions are made into the P epi layer 72 at 81 to provide source and drain regions. Gate oxide 82 is grown over the P epi between the source and drain 81 and gate metal electrode 83 is deposited and patterned over the oxide.

Then, etch resistant metal layers, as shown in FIG. 1, are deposited over the entire wafer. This metal is then patterned in accordance with the slot pattern of FIG. 3 and an etch is made through the N epi to expose the P epi layer 72. With an electrostop potential or passivating potential of 0.5 applied to the N epi layer, a suitable etchant such as EDP is employed to obtain an anisotropic etch of the P epi layer and to undercut the mass 55 to form the spacer gap between the mass 55 and the buried P+ layer 77. Next, the zirconium, TiW and gold is removed from those portions of the wafer corresponding to the MOS circuitry and the contact to the P+ buried layer. Traces of the zirconium, TiW and gold are left for making an electrical connection to the N+ regions 74 of the folded cantilever spring with integral mass. This metal also forms a connection to one input terminal of the MOS amplifier circuitry. In this manner, flexure of the folded cantilever spring structure 51, as loaded with the sensing mass 55 and the underlaying electrode 77. These capacitive variations are sensed and amplified by the MOS circuitry to provide an amplified output. Thus, a completed accelerometer is formed in the substrate wafer 11 utilizing a capacitive sensor without the requirement of a separate pyrex plate.

Referring now to FIG. 13, there is shown an alternative embodiment of the present invention. The embodiment of FIG. 13 is similar to that of FIG. 11 with the additional feature that a symmetrical folded cantilever flex structure with integral mass is formed in the wafer 11. More particularly, a P+ buried layered diffusion 77 is made in the upper surface of an N type wafer of [100] orientation. Layer 77 has a thickness corresponding to the spacer gap to be formed, i.e., between 1 and several microns. Next, an N epi layer 85, as of 0.2 to 15 microns thick is epitaxially grown on the N substrate 11. Next, a P epi layer 72, having a thickness of 10 to 150 microns, is grown on the N epi layer 85. Next, another N epi layer of thickness similar to that of layer 85 is grown on the P epi layer 72. An oxide is grown on the wafer, it is patterned and via holes 64 are etched through the oxide and silicon to the P+ layer 77. A subsequent P+ diffusion provides a P+ layer coating the via holes 64. The entire wafer is then metallized as shown in FIG. 1.

With an etch stop passivating potential of +0.5 volts relative to the electrolyte potential applied to the N epi layers via the N substrate 11 and N epi layer 85, the P epi material 72 is anisotropically etched using a suitable etchant such as EDP which has an etch stop on the underlaying P+ spacer layer 77. This etch defines the folded cantilever springs 51 and the integral mass 55.

The spacer is then etched by using the electro-chemical etch previously described with regard to FIGS. 8, 9, and 11 to selectively etch the spacer layer 77, thereby undercutting the folded cantilever springs 51 and the itegral mass 55 to free the mass and spring structure for flexure relative to the substrate wafer 11. The advantage to the structure of FIG. 13 is that a symmetrical folded cantilever 51 with integral mass structure 55 is formed integrally of the wafer 11 with etching of the silicon from one side only. The folded cantilever springs and the mass are all of the single crystalline material thereby avoiding undesired temperature coefficients. The resultant structure is bonded to a pyrex wafer in the manner as previously described with regard to FIGS. 9 and 11.

Referring now to FIG. 14, there is shown an alternative embodiment of the present invention similar to that of FIG. 13. In this embodiment, after the upper N epi layer 85 has been grown on the P epi layer 72, the wafer 11 is oxidized to form a mask which is opened at 74 and the P epi layer 72 is anisotropically etched in accordance with the boss and mass patterns 74 of FIG. 3. The etch passes completely through the P epi layer to the underlaying N epi layer 85. N epi material is then grown in these opening to completely fill the openings a5 86. The excessive N epi material is then lapped from the upper surface of the wafer 11 so that the upper extent of the N epi layer is flush with the upper extent of the P epi layer 72. The N epi layer 85 is then grown on the P epi and N epi layers. Thereafter, a via hole 64 is etched and lined with a P+ diffusion 78. The entire wafer 11 is metallized as in FIG. 1. The metal is etched with the slot pattern of FIG. 3. The folded cantilever spring structure 51 is undercut by anisotropic etch utilizing EDP etchant in the manner previously described with regard to FIG. 13. After the folded cantilevers 51 have been undercut and the central mass 55 defined, the P+ spacer layer 77 is selectively etched as in FIG. 11 to provide a spacer gap below the folded cantilever spring and integral mass 55 to free the spring and mass structure.

Referring now to FIGS. 15 and 16, there is shown an alternative embodiment of the present invention. The embodiment of FIGS. 15 and 16 is similar to that of FIGS. 13 and 14 except that an electrode 77 is provided underlaying the symmetrical folded cantilever spring structure 51 with integral mass 55. In this embodiment, an N substrate layer 11 of [100] orientation has a P+ buried layer diffusion layer 77 formed in the upper surface thereof. The buried layer diffusion 77 has a pattern as shown in FIG. 3 at 65 less the boss diffusion patterns 74 at 54. There is a lateral gap 91 between the periphery of the electrode P+ diffusion 77 and the subsequent boss diffusions 74 to prevent electrical shorting of the electrode diffusion 77 to the boss diffusions 74, to be subsequently described.

Next, an N epi spacer layer 92 is grown on the N substrate. The N epi spacer layer 92 has a thickness corresponding to the spacer to be formed, i.e., a fraction of a micron to a few microns. Next, P+ boss diffusions are made into the N epi layer in accordance with the boss patterns 74 of FIG. 3. Next, a P epi layer 93, having a thickness corresponding to the lower folded cantilever spring 51, i.e., 0.2 to 15 microns in thickness, is grown over the N epi layer 92. Next, an N epi layer 94 of 10 to 150 microns thickness is grown on the P epi layer 93. Next, the wafer 11 is oxidized and the oxide opened in accordance with the boss and central mass patterns 74 of FIG. 3. The N epi layer 94 is then anisotropically etched down to the P epi layer 93 followed by epitaxial growth of P epi material to a thickness equal to or greater than the thickness of the N epi layer 94. Thereafter, the upper surface of the wafer 11 is lapped and polished to provide a flat upper surface onto which is grown a P epi layer 95 to a thickness corresponding to the thickness of the upper cantilever spring 51 which is to be formed, i.e., 0.2 to 15 microns. Next, the wafer 11 is metallized in accordance with the metallization shown in FIG. 1. The metal is then opened to the slot pattern of FIG. 3 and the P epi layer 95 etched to expose the N epi layer 94.

Thereafter, the electro-etch stop process shown in FIG. 4 is utilized with a suitable anisotropic etchant, such as EDP, to anisotreopically etch the N epi material leaving the P epi folded cantilever springs 51 with central mass 55. This anisotropic etch also etches the N epi layer from underneath the lower spring and central mass to provide a spacer between the underlaying P+ electrode 77 and the mass and spring structure 51 which has been freed. After the P epi layer 95 was grown and before metallization, a via hole was etched and suitably P+ diffused and metallized as previously described with regard to FIGS. 11-14 for making 1 contact to the underlaying P+ electrode 77. The wafer 11 is then stripped of metal except in the via hole region 64.

The resultant structure is a symmetrical folded cantilever flex 51 with integral mass 55 spaced from a buried electrode 77 for sensing deflection of the mass 55 in response to forces exerted on the spring. This entire structure is of a single crystalline silicon formed by etching the wafer 11 from only one side. If desired, electronic circuitry could also be included on the wafer 11 in the manner as previously described with regard to FIG. 12.

The advantages afforded by etching three-dimensional structures, in accordance with the present invention, include less handling of fragile flex structures with attendant higher yields of completed devices. In addition, foreign bonding materials are eliminated together with the bonding steps and resultant temperature coefficients and thickness variations. Moreover, the wafer need be etched from one side only. Folded cantilever spring structures fabricated in the above manner are useful as accelerometer flexes, gauging transducers, valves and many other devices.

As used here, etch stop layer or etch stopped layer means the etch rate for the material of that layer, for the etchant used is less than one-tenth the etch rate for the other material or layer being etched.

What is claimed is:

1. In a method for making flexible structures by chemical etching of a semiconductive wafer, the steps of;

providing a first etch stop layer (12) on a wafer (11) of semiconductive material;

opening said first etch stop layer in a predetermined pattern (18);

introducing an etchant through said patterned opening (18) in said first etch stop layer (12);

etching the semiconductive wafer (11) through said opening pattern (18) in said first etch stop layer (12) to undercut substantial portions (51) of said first etch stop layer (12);

said opening (18) being patterned to define a support structure (54) of said wafer (11) and a doubled back cantilever portion (51) of said first etch stop layer (12); and terminating (50) the etch of wafer material such that one end of the undercut doubled back cantilever beam portion (51) is supported from the support structure (54) and the other end of the undercut doubled back cantilever beam portion terminates on a structure (55) which structure (55) is supported from and being movable relative to said support structure (54) by means of flexure of said undercut doubled back cantilever portion (51).

2. The method of claim 1 including the step of, forming a second etch stop layer portion underlaying said first etch stop layer portion and; wherein said step of etching the semiconductive wafer includes etching wafer material from inbetween said first and second etch stop layer portions.

3. The method of claim 2 wherein said opening pattern in said first etch stop layer is patterned so as to form when the etch is terminated a structural portion of the wafer substantially thicker than the cantilever beam portion and affixed to the end of the undercut doubled back cantilever portion remote from the support structure.

4. The method of claim 3 including the step of selectively etching said second etch stop layer to undercut said thicker structural portion affixed to the end of said undercut doubled back cantilever beam portion to free said thicker structural portion for movement with flexure of said doubled back cantilever beam portion.

5. The method of claim 3 including a step of providing a P+ type layer buried within said wafer in an N-type conductivity material and spaced from and underneath said thicker structural portion of said wafer, and including the step of selectively etching said wafer to undercut said thicker structural portion and to etch a spacer region inbetween said undercut structural portion of said P+ type layer to form a capacitive gap therebetween; and making electrical contact to said P+ type layer for capacitively coupling to said thicker structural portion.

6. The method of claim 1 wherein said wafer material and said first etch stop layer are of single crystalline semiconductive material.

7. The method of claim 1 wherein the step of etching the wafer includes etching said wafer material completely through the thickness of the wafer.

8. In a method for making flexible structures by chemical etching of a semiconductive wafer, the steps of:

providing a first etch stop layer (12) on a wafer (11) of semiconductive material;

opening said first etch stop layer in a predetermined pattern (18);

introducing an etchant through said patterned opening (18) in said first etch stop layer (12);

etching the semiconductive wafer (11) through said opening pattern (18) in said first etch stop layer (12) to undercut substantial portions (51) of said first etch stop layer (12);

said opening (18) being patterned to define a support structure (54) of said wafer (11) and a doubled back cantilever portion (51) of said first etch stop layer (12);

terminating (50) the etch of wafer material such that one end of the undercut doubled back cantilever beam portion (51) is supported from the support structure (54) and the other end of the undercut doubled back cantilever beam portion terminates on a structure (55) which structure (55) is supported from and being moveable relative to said support structure (54) by means of flexure of said undercut doubled back cantilever portion (51); and said pattern including central slot regions disposed intermediate the folded cantilever spring portions connecting said central portion (55) to said support structure (54), said central slot region terminating at one end on a (111) plane defining one side of said central support (55) for preventing the undercutting of structure (55) during etching.

9. The method of claim 8 including the step of forming a second etch stop layer portion underlaying said first etch stop layer portion and; wherein said step of etching the semiconductive wafer includes etching wafer material from inbetween said first and second etch stop layer portions.

10. The method of claim 9 wherein said opening pattern in said first etch stop layer is patterned so as to form when the etch is terminated a structural portion of the wafer substantially thicker than the cantilever beam portion and affixed to the end of the undercut doubled back cantilever portion remote from the support structure.

11. The method of claim 10 including the step of selectively etching said second etch stop layer to undercut said thicker structural portion affixed to the end of said undercut doubled back cantilever beam portion to free said thicker structural portion for movement with flexure of said doubled back cantilever beam portion.

12. The method of claim 10 including a step of providing a P+ type layer buried within said wafer in an N type conductivity material and spaced from and beneath said thicker structural portion of said wafer, and including the step of selectively etching said wafer to undercut said thicker structural portion and to etch a spacer region inbetween said undercut structural portion and said P+ type layer to form a capacitive gap therebetween; and making electrical contact to said P+ type layer for capacitively coupling to said thicker structural portion.

* * * * *